United States Patent [19]

Chorlton

[11] 4,143,756
[45] Mar. 13, 1979

[54] CONVEYOR ORIENTATION UNIT

[75] Inventor: Derek C. Chorlton, Stoke-on-Trent, England

[73] Assignee: Conveyor Manufacturing Company Limited, Wednesbury, England

[21] Appl. No.: 858,309

[22] Filed: Dec. 7, 1977

Related U.S. Application Data

[63] Continuation of Ser. No. 686,271, May 14, 1976.

[30] Foreign Application Priority Data

May 16, 1975 [GB] United Kingdom ............... 20859/75
Oct. 5, 1975 [GB] United Kingdom ............... 40885/75

[51] Int. Cl.$^2$ ............................................. B65G 47/54
[52] U.S. Cl. .................................... 198/457; 198/787
[58] Field of Search ............... 198/357, 363, 410, 448, 198/471, 601, 608, 780, 786, 787, 790, 457, 860, 861

[56] References Cited

U.S. PATENT DOCUMENTS

| Re. 25,673 | 11/1964 | Burt | 198/601 |
|---|---|---|---|
| 1,456,623 | 5/1923 | Damm | 198/790 |
| 1,931,454 | 10/1933 | Anderson | 198/448 |
| 1,960,307 | 5/1934 | Fisk | 198/786 |
| 2,602,537 | 7/1952 | Talbot | 198/786 |
| 3,063,544 | 11/1962 | Posheng Yen | 198/357 |
| 3,268,059 | 8/1966 | Hill | 198/786 |
| 3,355,006 | 11/1967 | Hielbrunn | 198/780 |
| 3,610,404 | 10/1971 | Fleischauer et al. | 198/780 |
| 3,650,375 | 3/1972 | Fleischauer et al. | 198/790 |
| 3,902,588 | 9/1975 | Sato | 198/787 |

FOREIGN PATENT DOCUMENTS 2353036  5/1974  Fed. Rep. of Germany ........... 198/780

*Primary Examiner*—Robert B. Reeves
*Assistant Examiner*—Richard K. Thomson
*Attorney, Agent, or Firm*—Edwin E. Greigg

[57] ABSTRACT

The present invention is directed to a conveyor in which an article to be transferred is turned through an angle by means of two pluralities of juxtaposed rollers in a single plane, the pluralities having the spin axes of their rollers parallel to each other within the plurality and the spin axis of each roller in one plurality inclined at an angle to the spin axis of each roller in the other plurality by approximately half the angle through which the article is to be turned during the transfer.

5 Claims, 13 Drawing Figures

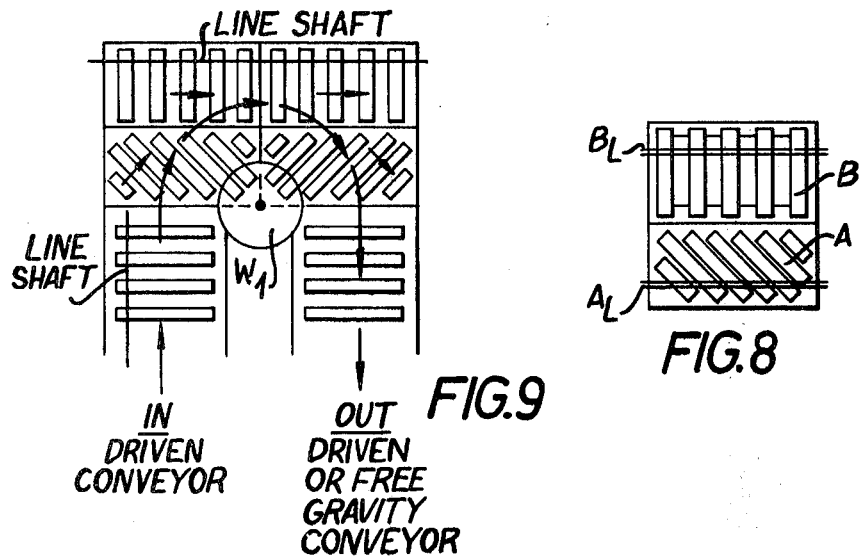
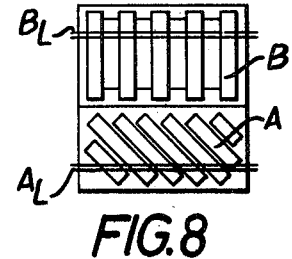
FIG.9
FIG.8
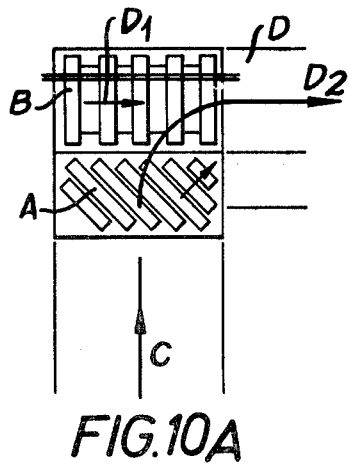
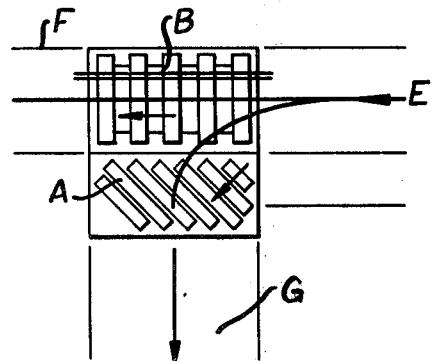
FIG.10A
FIG.10B

CONVEYOR ORIENTATION UNIT

This is a continuation, of application Ser. No. 686,271, filed May 14, 1976.

This invention relates to a roller conveyor for use in transferring an article. It is well known in the conveyor art that it is often desirable but not simple to turn an article conveyed along one conveyor through an angle such as a right angle or two right angles and re-direct it for example to another conveyor. Again, it is often desirable but not simple to direct an article conveyed along one conveyor into a 'crank' motion or to merge the path of articles conveyed along two parallel conveyors of a given width into one conveyor of the width of one conveyor alone. Alternatively, it is often desirable to close the conveying path of a simple wide conveyor into a single conveyor having a conveying path of a lesser width.

These desiderata are achieved according to the present invention by means of a roller conveyor for use in changing the direction of an article being transferred thereon, said conveyor comprising two juxtaposed pluralities of rollers, each roller journalled in a support with its rolling surface proud of the support and the rolling surfaces of all the rollers in substantially a single plane, each spin axis of the spin axes of the rollers of one plurality being substantially parallel to each other and each at an angle to the substantially parallel spin axes of the rollers of the other plurality, said angle bieng approximately half the angle through which the article is to be changed in its direction during the transfer.

The invention will be more fully understood from the description given below by way of example only of a conveyor with reference to the FIGS. of the accompanying drawing, in which:

FIG. 8 is a schematic showing a conveyor similar to that of FIG. 2 with line shafts, FIG. 9 is a schematic showing two conveyors similar to that of FIG. 2 for turning an article that is conveyed through 180°, FIG. $10_A$ and $10_B$ are schematics showing a conveyor in operation.

Figure 1:
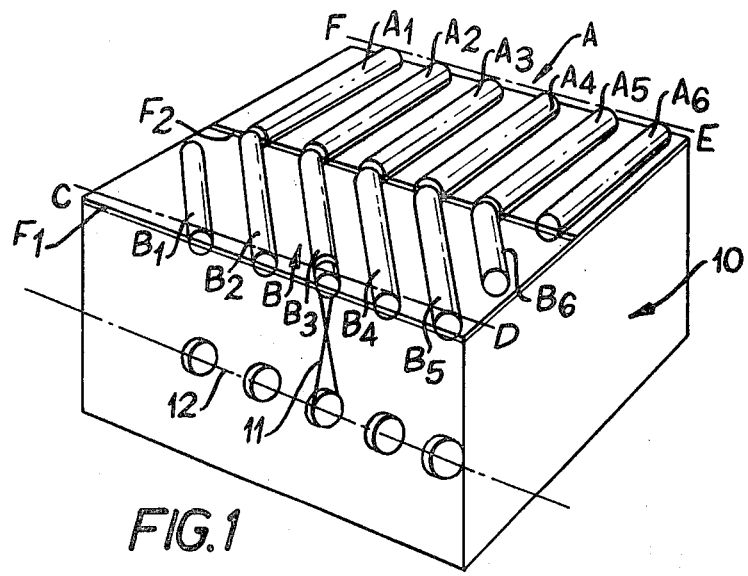
FIG. 1 is a view in oblique perspective of a conveyor of the invention.

Referring now to FIG. 1, a line conveyor shown generally at 10 is of square form in plan and has two pluralities of rollers, group A, group B, comprising rollers $A_1$, $A_2$, $A_3$, $A_4$, $A_5$, $A_6$ and rollers $B_1$, $B_2$, $B_3$, $B_4$, $B_5$ and $B_6$.

The spin axes of the rollers $A_1$ to $A_6$ are substantially parallel to each other as are the spin axes of the rollers $B_1$ to $B_6$. The axis of any roller in group A is inclined to the axis of any roller in group B at approximately 45° of arc in a plane parallel to the single plane C, D, E, F, which plane contains all the rolling surfaces of the rollers of the two groups A and B.

The drive to the rollers of both groups is generally by means of small belts 11 from a line shaft 12 running beneath the rollers but it may be any other method such as inter alia a chain, friction rollers or gearing.

Figure 2:
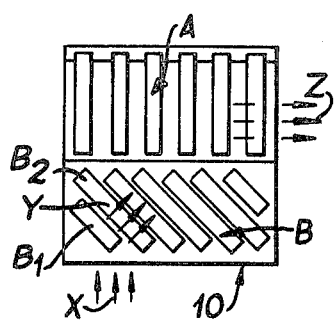
FIG. 2, 3, 4, 5 and 6 are schematics showing a conveyor in use.

Referring now to FIG. 2, articles conveyed in the direction of multiple arrow X enter a conveyor 10 which may be a gravity conveyor with free running rollers or a live conveyor with all rollers driven or a live conveyor with some rollers driven and some 'dead' or free running rollers. The articles are turned in the direction of multiple arrows Y by means of the rollers $B_1$, $B_2$ etc. of group B; the articles then enter the rollers of group A and emerge from the conveyor 10 in the direction of multiple arrows Z. The articles entering at X leave the conveyor at Z and have been transferred through a right angle.

Figure 3:
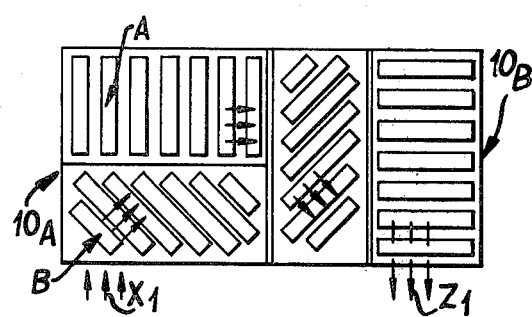

Two conveyors $10_A$, $10_B$ placed as in FIG. 3 provide means for changing the direction of an article through two right angles. Articles entering at multiple arrows $X_1$ move across rollers of group B of conveyor $10_A$ on to the rollers of group A and then on to the rollers of group B of conveyor $10_B$. The articles then move on to the rollers of group A to leave the conveyor $10_B$, as shown by the multiple arrows $Z_1$.

Figure 4:
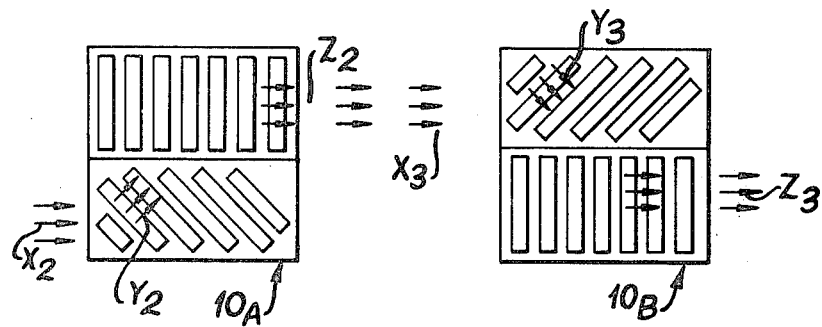

Referring now to FIG. 4, articles entering a conveyor $10_A$ may be caused to take a 'crank' path and leave via a conveyor $10_B$. The 'crank' path is shown by the sequence of multiple arrows $X_2$, $Y_2$, $Z_2$, $X_3$, $Y_3$, $Z_3$.

Figure 5:
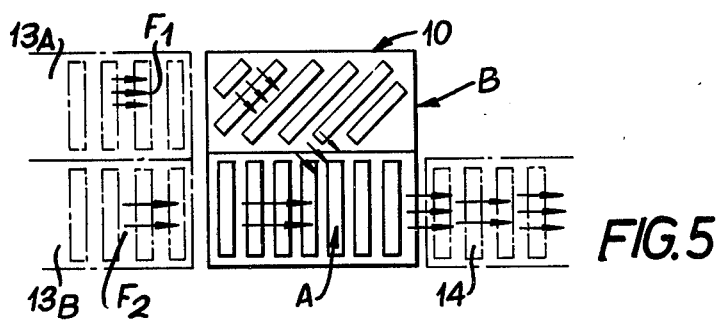

Referring now to FIG. 5, a parallel double conveyor $13_A$ $13_B$ feeds articles shown by the multiple small arrows $F_1$ and multiple large arrows $F_2$ on to a conveyor 10. The articles shown by arrows $F_1$ pass to rollers of group B, move to the rollers of group A and leave the conveyor 10 on conveyor 14. The articles shown by arrows $F_2$ pass to rollers of group A and leave directly on conveyor 14. The two groups of articles $F_1$, $F_2$ entering the conveyor 10 via two conveyors ($13_A$, $13_B$) are now combined on to a single conveyor 14.

Figure 6:
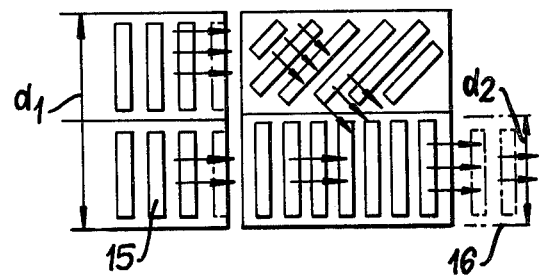

In a not dissimilar fashion (FIG. 6), a wide single conveyor 15 of width $d_1$ may be replaced by a conveyor 16 of lesser width $d_2$ ($D_2 < d_1$).

Figure 7:
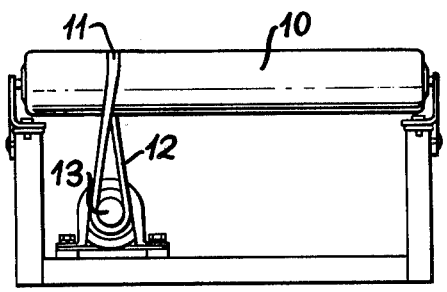
FIG. 7 is a side elevation of a single live roller driven by a belt.

FIG. 7 shows a single live roller driven at one end; in a preferred construction of live conveyor each roller may be driven at this manner. The roller 10 is provided with a part 11 which co-operates with a figure-of-eight belt 12 and a line shaft 13. This construction simplifies the drive to the two groups of rollers (A and B, FIG. 1), as is clearly shown in FIG. 8, where the two groups of rollers A and B of the conveyor are each provided with a line shaft $A_L$ and $B_L$ respectively.

In use, two conveyors of the invention may provide a conveyor arrangement as shown in FIG. 9. In such an arrangement, articles being conveyed may be assisted in their path of movement by means of a freely journalled wheel $W_1$ placed as shown with its spin axis normal to the single plane CDEF of FIG. 1.

The direction of rotation of the rollers of the two groups, groups A and B, is generally such that an article such as a package entering the conveyor on to rollers A as shown by arrow C in FIG. $10_A$ is transferred as shown by arrow $D_2$, that is to say it enters a conveyor D via rollers B and continues in the line of the direction $D_1$ $D_2$ given to it by rollers B, the package having been turned through a right angle. It is to be understood that a reversal of the direction of rotation of the rollers A and B produces, as shown in FIG. $10_B$, a movement of an article such as a package entering the conveyor in the direction of arrow E that continues along a second in-line conveyor F directly over the rollers B; if, however, the article is in contact with rollers A it is transferred to a third conveyor G and is turned through a right angle.

It is to be made clear that the angle of the spin axes of the rollers in one group to the spin axes of the rollers in the other group may be any suitable angle and need not be restricted to approximately forty five degrees provided it gives the correct orientation to the article or package that is to be transferred as it passes over the two groups of rollers. For success, the change of direction of a right angle requires that the two groups of spin axes of the rollers be at an angle of approximately one half right angle and similarly for any other change of angle of direction will require that the spin axes be at an angle that is approximately one half of the change that is required.

Figure 11:
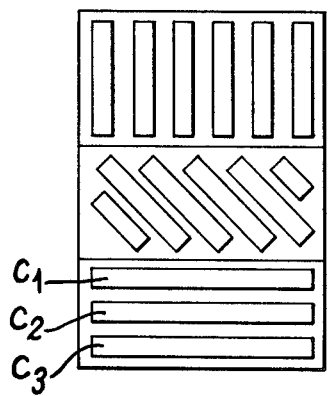
FIG. 11 is a schematic showing a conveyor with a third plurality of rollers.

A conveyor of the invention may conveniently take the form shown in FIG. 11, one or more extra plurality of rollers such as rollers $C_1$, $C_2$, $C_3$ being added to form an integral part of the conveyor.

Figure 12:
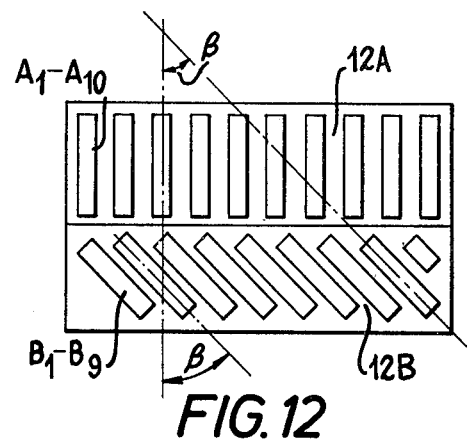
FIG. 12 is a schematic showing an oblong frame containing two pluralities of juxtaposed rollers.

A conveyor of the invention may take the form shown in FIG. 12, where the frame is that of an oblong, that is to say rectangular with the adjacent sides unequal and divided into two equal rectangular parts $12_A$, $12_B$ each part containing a plurality of journalled rollers $A_1$ to $A_{10}$ and $B_1$ to $B_9$.

The axis of any one roller of one plurality is inclined at an angle to the axis of any one roller of the other plurality which angle is shown as the angle $\beta$.

The individual rollers of each plurality have their spin axes substantially parallel to one another.

It will be clear that the conveyor may be a live conveyor with some dead rollers and that it may if desired by a gravity conveyor with all of the rollers freely journalled to transfer an article pushed over the roller surface or made to pass over it by the force of gravity derived from a suitably inclined feed to and inclined egress away from the conveyor.

The rollers of the conveyor are generally parallel sided right cylindrical rollers of circular cross section but they may to assist the transfer of articles be of right frusto-conical form but the rolling surface is still a single plane. The rollers may if desired be wheels.

What I claim is:

1. In a roller conveyor, a portion for changing through 90° the direction of travel of articles being conveyed comprising:
    a support; and
    first and second groups of rollers mounted in juxaposition in said support for axial rotation, each roller being journalled with its rolling surface above the upper level of said support and the rolling surface of all rollers of both groups lying in substantially the same horizontal plane, the individual rollers in each group being of substantially equal and uniform diameter and arranged with their axes of rotation parallel to each other to define a pass-line substantially perpendicular to said axes of rotation, the axes of rotation of one group of rollers being at an angle to the axes of rotation of the other group and the respective pass-lines of each group intersecting at an angle of substantially 45° whereby the articles are turned through 90° by feeding them onto said first group of rollers along a path which is parallel to the axes of said second group of rollers.

2. The roller conveyor according to claim 1 wherein said support is a single square frame divided into two substantially equal rectangular parts.

3. The roller conveyor according to claim 1 wherein at least some of each group of rollers is provided with drive means.

4. The roller conveyor according to claim 3 wherein the drive means is a belt-drive.

5. The roller conveyor according to claim 1 including a wheel positioned above the plane of said rollers and having its axis of rotation normal to said plane whereby an article being transferred is assisted in its change of path between said groups of rollers.

* * * * *